(12) United States Patent
Replete

(10) Patent No.: US 10,794,448 B2
(45) Date of Patent: Oct. 6, 2020

(54) ISOLATOR THAT INCLUDES FIRST AND SECOND ISOLATION SPRING ARRANGEMENT IN SERIES

(71) Applicant: Litens Automotive Partnership, Woodbridge (CA)

(72) Inventor: Boris Replete, Toronto (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 202 days.

(21) Appl. No.: 15/560,098

(22) PCT Filed: Mar. 21, 2016

(86) PCT No.: PCT/CA2016/050326
§ 371 (c)(1),
(2) Date: Sep. 20, 2017

(87) PCT Pub. No.: WO2016/149816
PCT Pub. Date: Sep. 29, 2016

(65) Prior Publication Data
US 2018/0087599 A1    Mar. 29, 2018

Related U.S. Application Data

(60) Provisional application No. 62/135,800, filed on Mar. 20, 2015.

(51) Int. Cl.
*F16F 15/121* (2006.01)
*B60K 25/02* (2006.01)
(Continued)

(52) U.S. Cl.
CPC .......... *F16F 15/1216* (2013.01); *B60K 25/02* (2013.01); *F16F 15/121* (2013.01);
(Continued)

(58) Field of Classification Search
CPC .... F16H 55/14; F16H 55/36; F16H 2055/366; F16F 15/121; F16F 15/1216; F16F 15/12366; B60K 25/02; B60K 2025/022
(Continued)

(56) References Cited

U.S. PATENT DOCUMENTS 6,048,284 A    4/2000  Gerhardt et al.
6,050,383 A    4/2000  Hashimoto
(Continued)

FOREIGN PATENT DOCUMENTS

CN    1856664 A    11/2006
CN    101432541 A    5/2009
(Continued)

OTHER PUBLICATIONS

Office Action for CN201680016413 dated Nov. 21, 2018.
(Continued)

*Primary Examiner* — Michael R Mansen
*Assistant Examiner* — Juan J Campos, Jr.
(74) *Attorney, Agent, or Firm* — Millman IP Inc.

(57) ABSTRACT

In an aspect, an isolator is provided for isolating a device driven by an engine via an endless drive member. The isolator includes a shaft adapter that is connectable with a shaft of the device and that defines an isolator axis, a rotary drive member that is engageable with the endless drive member, a first isolation spring arrangement that includes a first torsion spring, and that is positioned to transfer torque between the shaft adapter and an intermediate drive member, and a second isolation spring arrangement that is positioned to transfer torque between the intermediate member and the rotary drive member.

18 Claims, 13 Drawing Sheets

(51) Int. Cl.
  *F16H 55/36* (2006.01)
  *F16F 15/123* (2006.01)
(52) U.S. Cl.
  CPC ....... *F16F 15/12366* (2013.01); *F16H 55/36* (2013.01); *B60K 2025/022* (2013.01); *F16H 2055/366* (2013.01)
(58) Field of Classification Search
  USPC .......................................................... 474/94
  See application file for complete search history.

(56) References Cited

U.S. PATENT DOCUMENTS

| | | | |
|---|---|---|---|
| 6,083,130 | A | 7/2000 | Mevissen |
| 6,227,977 | B1 | 5/2001 | Tanaka |
| 7,708,661 | B2 | 5/2010 | Pflug et al. |
| 8,813,928 | B2 | 8/2014 | Schneider et al. |
| 2003/0045362 | A1 | 3/2003 | Aoki |
| 2007/0037644 | A1* | 2/2007 | Mevissen ................ F16D 7/022 474/70 |
| 2009/0121401 | A1 | 5/2009 | Steffen et al. |
| 2011/0065537 | A1* | 3/2011 | Serkh ...................... F16D 7/022 474/94 |
| 2012/0015768 | A1 | 1/2012 | Serkh et al. |
| 2015/0072813 | A1 | 3/2015 | Yoon |

FOREIGN PATENT DOCUMENTS

| | | |
|---|---|---|
| CN | 101466964 A | 6/2009 |
| DE | 102004010884 A1 | 10/2004 |
| DE | 102007058018 A1 | 3/2007 |
| DE | 102006039362 A1 | 3/2008 |
| DE | 102009039989 A1 | 4/2010 |
| WO | 2012162280 A1 | 11/2012 |
| WO | 2013124009 A1 | 8/2013 |
| WO | 2014056097 A1 | 4/2014 |
| WO | 2014185147 A1 | 11/2014 |

OTHER PUBLICATIONS

Office Action for CN201680016413.6 dated Sep. 12, 2019.
EESR for EP16767583 dated Feb. 19, 2019.
International Search Report for PCT/CA2016/050326 dated May 31, 2016.

* cited by examiner

US 10,794,448 B2

ISOLATOR THAT INCLUDES FIRST AND SECOND ISOLATION SPRING ARRANGEMENT IN SERIES

CROSS-REFERENCE TO RELATED APPLICATIONS

This application claims priority to U.S. Provisional Patent Application No. 62/135,800 filed Mar. 20, 2015, the contents of which are incorporated herein in their entirety.

FIELD

This disclosure relates to isolators and in particular to isolators that are used on an engine crankshaft or on a motor-generator unit (MGU) shaft in vehicles in which the engine 51 can be started or boosted by the MGU through a belt (e.g. an engine equipped with a belt-alternator start (BAS) drive system).

BACKGROUND

Isolators are known devices that are installed on engine crankshafts and on accessory drive shafts for reducing the transmission of torsional vibrations from the crankshaft to a belt driven by the crankshaft. While a traditional isolator is useful in many vehicular applications, some isolators do not perform ideally in applications wherein the belt is sometimes used to transmit torque to the crankshaft, for example as part of a Belt-Assisted Start (BAS) drive system wherein an electric motor is used to drive the belt in order to drive the crankshaft for the purpose of starting the engine 51.

It would be advantageous to provide an isolator that is configured for use in vehicles with BAS drive systems or the like.

SUMMARY

In an aspect, an isolator is provided for isolating a device driven by an engine via an endless drive member. The isolator includes a shaft adapter that is connectable with a shaft of the device and that defines an isolator axis, a rotary drive member that is engageable with the endless drive member, a first isolation spring arrangement that includes a first torsion spring, and that is positioned to transfer torque between the shaft adapter and an intermediate drive member, and a second isolation spring arrangement that is positioned to transfer torque between the intermediate member and the rotary drive member.

In another aspect, an isolator is provided for isolating a device driven by an engine via an endless drive member. The isolator includes a shaft adapter that is connectable with a shaft of the device and that defines an isolator axis, a rotary drive member that is engageable with the endless drive member, a first isolation spring arrangement that is positioned to transfer torque between the shaft adapter and an intermediate drive member, and a second isolation spring arrangement that is positioned to transfer torque between the intermediate member and the rotary drive member. The intermediate member and the shaft adapter each have an spring bypass surface. The spring bypass surfaces are positioned to engage one another to provide a solid drive connection between the intermediate member and the shaft adapter during relative rotation during torque transfer from the shaft adapter to the intermediate member thereby bypassing the first isolation spring arrangement.

In another aspect, an isolator is provided for isolating a device driven by an engine via an endless drive member. The isolator includes a shaft adapter that is connectable with a shaft of the device and that defines an isolator axis, a rotary drive member that is engageable with the endless drive member, a first isolation spring arrangement that is positioned to transfer torque between the shaft adapter and an intermediate drive member, and a second isolation spring arrangement that is positioned to transfer torque between the intermediate member and the rotary drive member. Over a first range of relative angular movement between the rotary drive member and the shaft adapter the first and second isolation spring arrangements provide a first overall spring rate for the isolator, over a second range of relative angular movement between the rotary drive member and the shaft adapter the first and second isolation spring arrangements provide a second overall spring rate for the isolator that is higher than the first overall spring rate, and wherein over a third range of relative angular movement between the rotary drive member and the shaft adapter the first and second isolation spring arrangements provide a third finite overall spring rate for the isolator that is higher than the second overall spring rate.

BRIEF DESCRIPTION OF THE DRAWINGS

The foregoing and other aspects will now be described by way of example only with reference to the attached drawings, in which.

DETAILED DESCRIPTION OF EXAMPLE EMBODIMENTS

Figure 1:
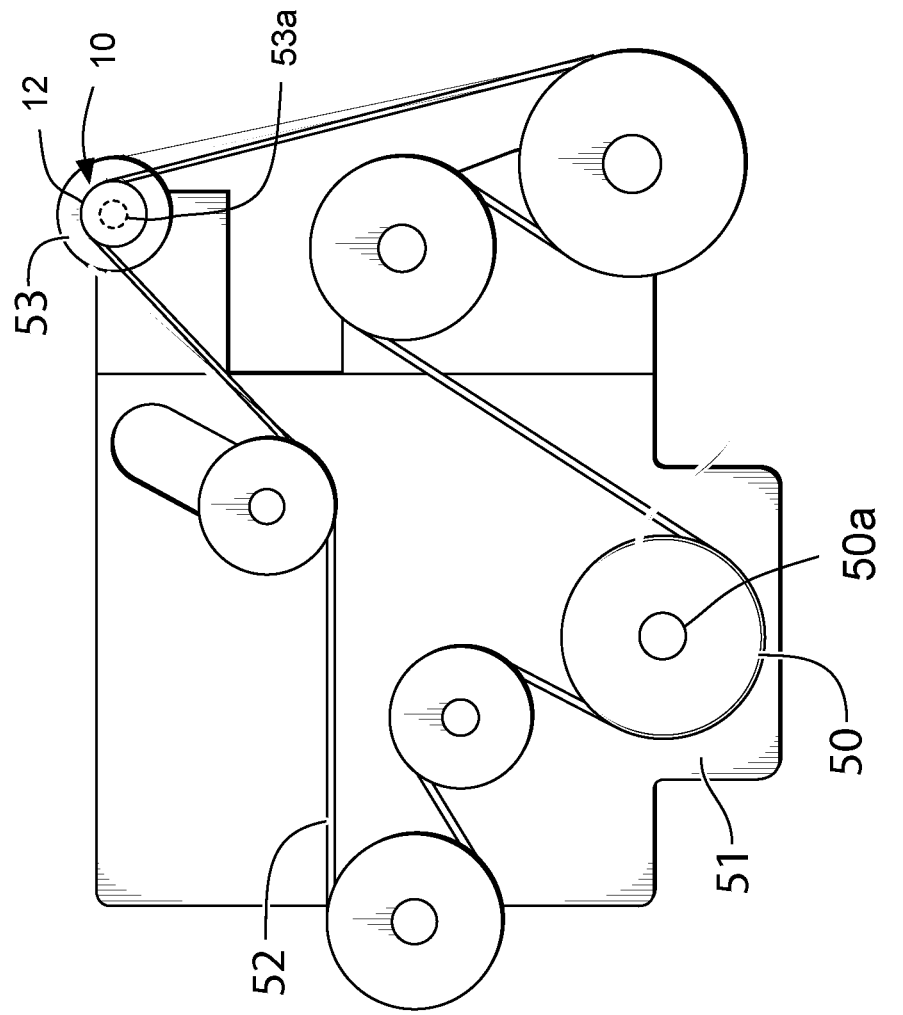
FIG. 1 is a side view of an engine in a vehicle containing an isolator on a shaft of an MGU (motor-generator unit), in accordance with an embodiment of the present invention.

Reference is made to FIG. 1, which shows an isolator 10 that transfers power between an endless drive member 52, such as an accessory drive belt, that is driven by a crankshaft pulley 50 mounted on a crankshaft 50a of an engine 51, and a shaft 53a of an MGU (motor-generator unit) 53, in accordance with an embodiment of the present invention. The isolator 10 isolates the MGU 53 from torsional vibrations in the endless drive member 52 that commonly occur in internal combustion engines. The endless drive member 52 may be referred to as a belt for convenience, however, any suitable endless drive member may be used. The isolator 10 is for isolating a device such as the MGU 53, that is driven by the engine 51 10 via the endless drive member 52.

The isolator 10 is useful in any engine, but is particularly useful in an engine that incorporates a BAS (belt-alternator start) system, in which the engine 51 is initially started normally (e.g. using a starter motor) but is shut down for brief periods (e.g. while the vehicle is at a stoplight) and then restarted by driving belt 52 with the MGU 53 and driving the crankshaft 50a from the belt 52. Alternatively, the MGU 53 may be replaced by an alternator, such that a separate motor may be used to drive the belt 52 during BAS events. BAS technology is becoming increasingly common in an effort to increase fuel economy and reduce emissions of vehicles.

Isolator with Torsion Spring in Series with Helical Compression Springs

Figure 2:
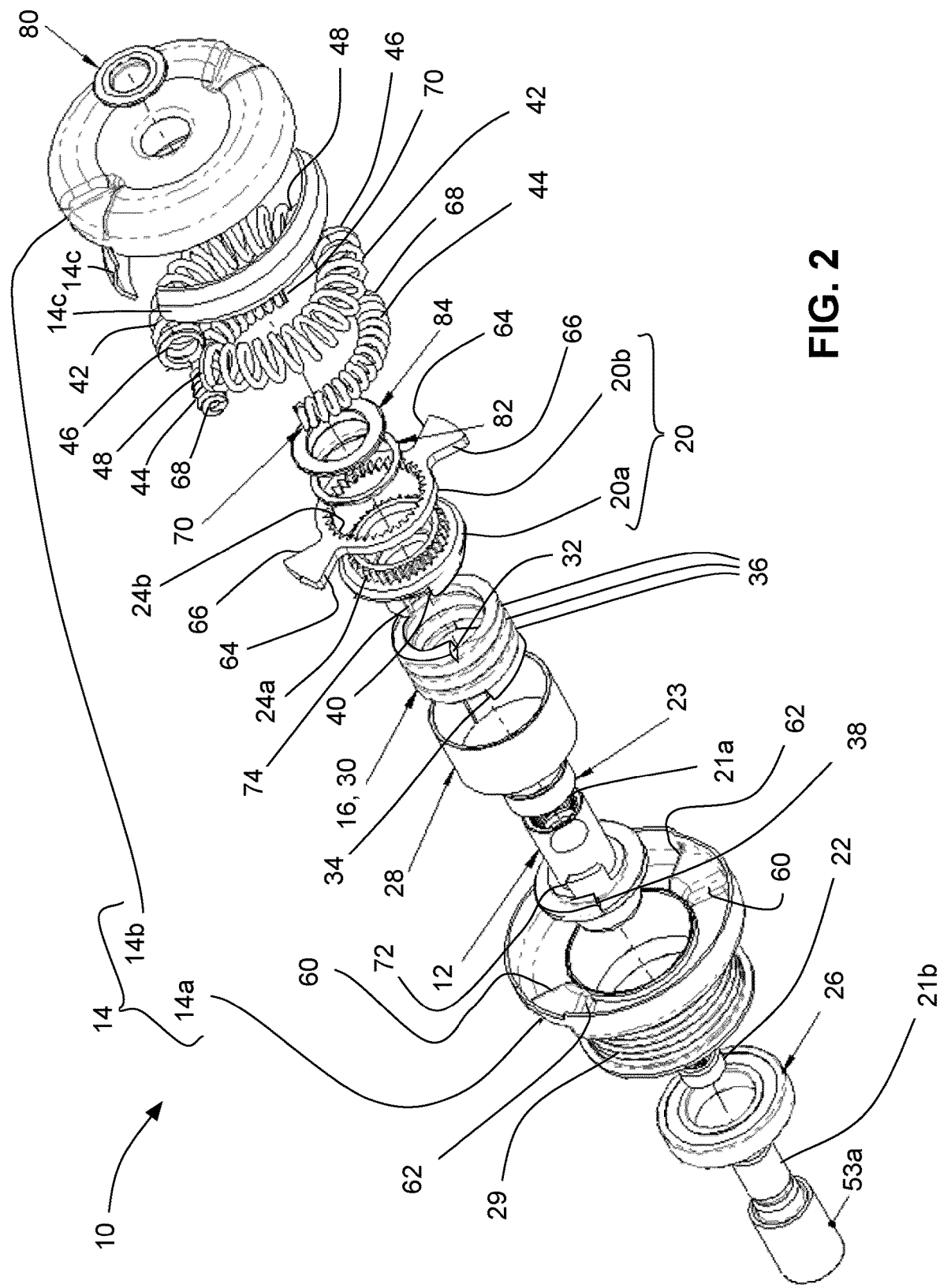
FIG. 2 is an exploded perspective view of the isolator shown in FIG. 1.

As seen in FIG. 2, the isolator 10 includes a shaft adapter 12, a rotary drive member 14 (which may for convenience be referred to as a pulley 14, but which may be any other suitable type of rotary drive member), a first isolation spring arrangement 16, a second isolation spring arrangement 18, and an intermediate member 20.

The shaft adapter 12 is connectable with the shaft of the device to be isolated (in this instance, the MGU shaft 53a). The connection of the shaft adapter 12 may be by any suitable means such as by a threaded connection, whereby the shaft adapter 12 has a threaded aperture 21a (shown more clearly in FIG. 3) that mates with a threaded outer surface 21b on the MGU shaft 53a. A nut 22 or some other suitable locking member may be inserted into the threaded aperture 21a and may abut the end of the MGU shaft 53a to apply an axial force thereon, so as to encourage axial engagement forces on the threaded aperture 21a and the threaded outer surface 21b. The shaft adapter 12 defines an isolator axis A, which is coincident with the axis of the MGU shaft 53a.

The intermediate member 20 is rotatably mounted to the shaft adapter 12 by an intermediate member bushing 23. The intermediate member 20 may be made from a first intermediate member portion 20a and a second intermediate member 20b that are rotationally engaged with one another via first and second toothed engagement surfaces 24a and 24b. In other embodiments, the intermediate member 20 may be made from a single piece.

The pulley 14 is rotatably mounted to the shaft adapter 12. In the embodiment shown in FIGS. 2-6, the pulley 14 is mounted at one axial end on a pulley bearing 26 that supports the pulley 14 directly on the shaft adapter 12, and is mounted at a second point that is axially spaced from the first axial end, on a pulley bushing 28 that supports the pulley 14 on the intermediate member 20, which is itself rotatably mounted on the shaft adapter 12 via the intermediate member bushing 23 as described above. The pulley 14 includes an endless drive member engagement surface 29, which may be, for example, an outer surface with a plurality of V-grooves for engagement with a poly-V groove belt 52.

The pulley 14 may be made up of a pulley main body 14a and a cover member 14b. The pulley main body 14a and the cover member 14b together define a spring shell that houses the second isolation spring arrangement 18 in the embodiment shown in FIGS. 2-6. Additional shell members 14c may be provided which can provide several functions, such as to inhibit metal to metal contact between the springs that make up the second isolation spring arrangement 18 and other portions of the pulley 14 (i.e. members 14a and 14b) which are metallic in at least some embodiments, by providing a polymeric layer between them and the springs.

The first isolation spring arrangement 16 may include a torsion spring 30 and is positioned to transfer torque between the shaft adapter 12 and the intermediate drive member 20, as is described further below. In the embodiment shown, the torsion spring 30 has a first helical end 32, a second helical end 34 and a plurality of helical coils 36 between the first and second helical ends 32 and 34. The first helical end 32 abuts a first intermediate member spring drive surface 40 on the intermediate member 20. The second helical end 34 abuts a shaft adapter drive surface 38 on the shaft adapter 12.

During torque transfer through the torsion spring 30, the torsion spring 30 expands radially outward by some amount. A torque limiter sleeve may be provided for limiting the amount of radial expansion that the torsion spring 30 can undergo prior to lock up of the torsion spring 30. The torque limiter sleeve provided by an axial extension of the bushing 28 that rotatably supports the pulley 14 on the intermediate member 20.

The second isolation spring arrangement 18 is positioned to transfer torque between the intermediate member 20 and the rotary drive member 14. The second isolation spring arrangement 18 may include at least one first helical compression spring 42 and may optionally includes at least one second helical compression spring 44.

In the embodiment shown the second isolation spring arrangement 18 includes a plurality of first arcuate helical compression springs 42 (e.g. two springs 42), and includes a plurality of optional second arcuate helical compression springs 44 (e.g. two springs 44). The first helical compression springs 42 each have a first end face 46 and a second end face 48, wherein the first and second end faces 46 and 48 are engageable with the first and second pulley drive surfaces 60 and 62 on the pulley 14, and with second and third intermediate member drive surfaces 64 and 66 on the intermediate member 20.

Figure 5A:
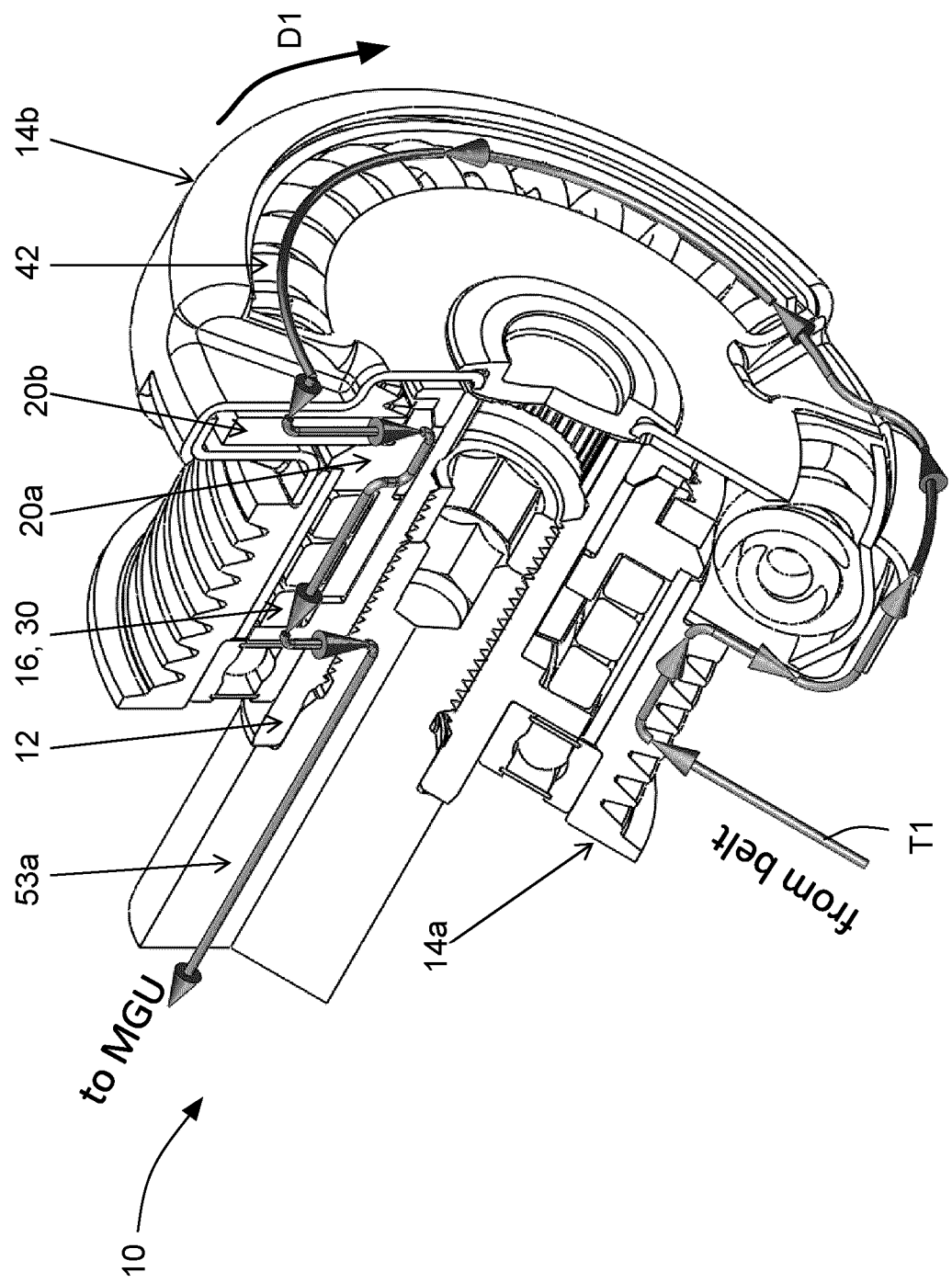
FIGS. 5a and 5b are perspective cutaway views of the isolator shown in FIG. 1 illustrating torque paths through the isolator.
Figure 5B:
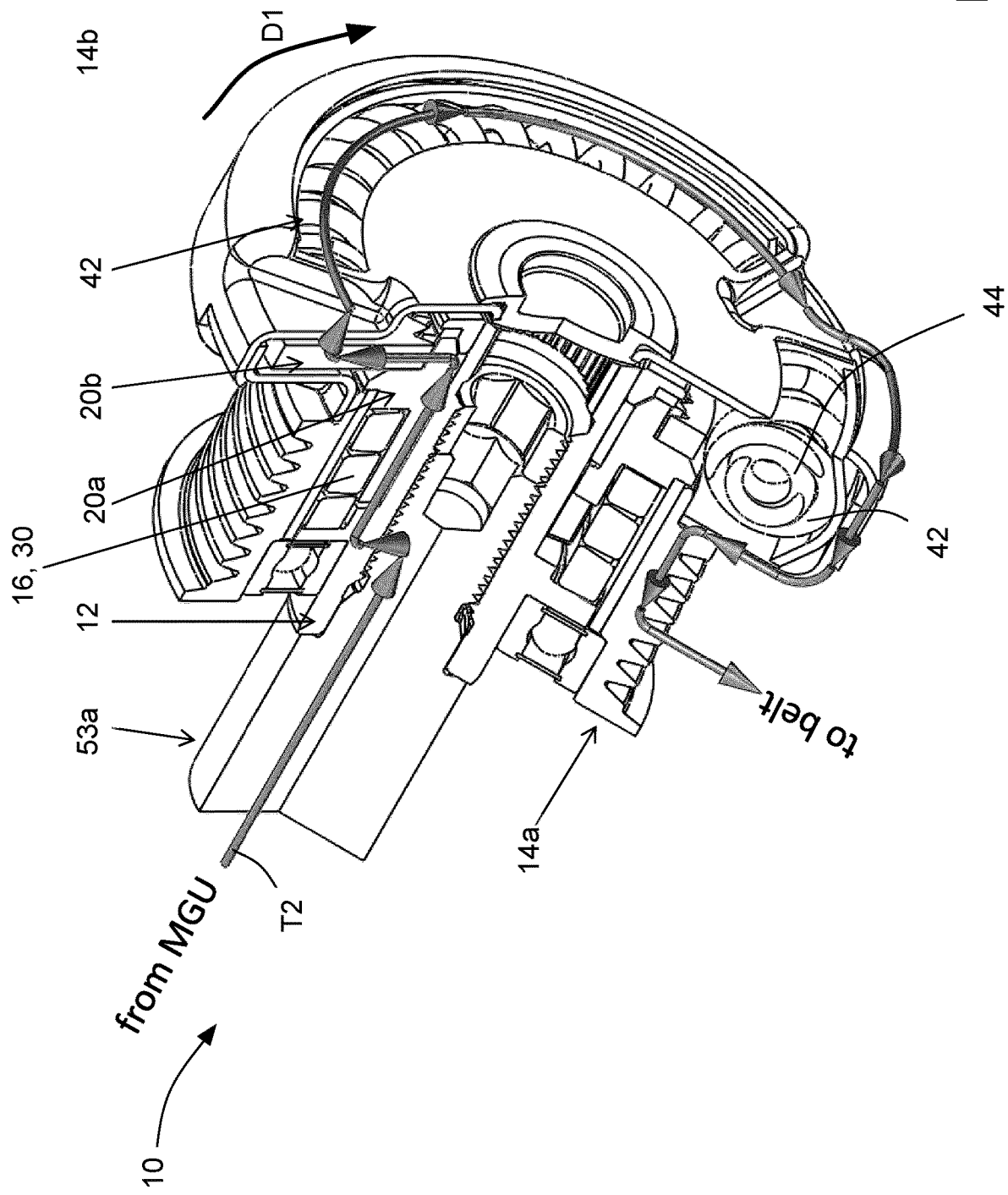

The torque path for torque to be transferred from the pulley 14 to the shaft adapter 12 is shown at T1 in FIG. 5a. As can be seen, torque is transferred from the pulley 14, through the second isolation spring arrangement, in turn through the intermediate member 20, in turn through the first isolation spring arrangement, and in turn into the shaft adapter. More particularly, when torque is transferred from the pulley 14 into the shaft adapter 12, torque is transferred from the first pulley drive surfaces 60 into the first ends 46 of the first helical compression springs 42, and from the second ends 48 of the springs 42 into the second intermediate member drive surfaces 64. Torque is then transferred from the first intermediate member drive surface 40 into the first helical end 32 of the torsion spring 30, and from the second helical end 34 of the torsion spring 30 into the shaft adapter drive surface 38 on the shaft adapter 12.

The second arcuate helical compression springs 44 each have a first end face 68 and a second end face 70, wherein the first and second end faces 68 and 70 are engageable with the first and second pulley drive surfaces 60 and 62 on the pulley 14, and with the second and third intermediate member drive surfaces 64 and 66 on the intermediate member 20.

The second arcuate helical compression springs 44 may be nested inside the first arcuate helical compression springs 42, and may be shorter in length than the first arcuate helical compression springs 42. As a result of the differences in length, the second arcuate helical compression springs 44 begin to be compressed between the pulley 14 and the intermediate member 20 at a different time than the first arcuate helical compression springs 42.

Figure 6:
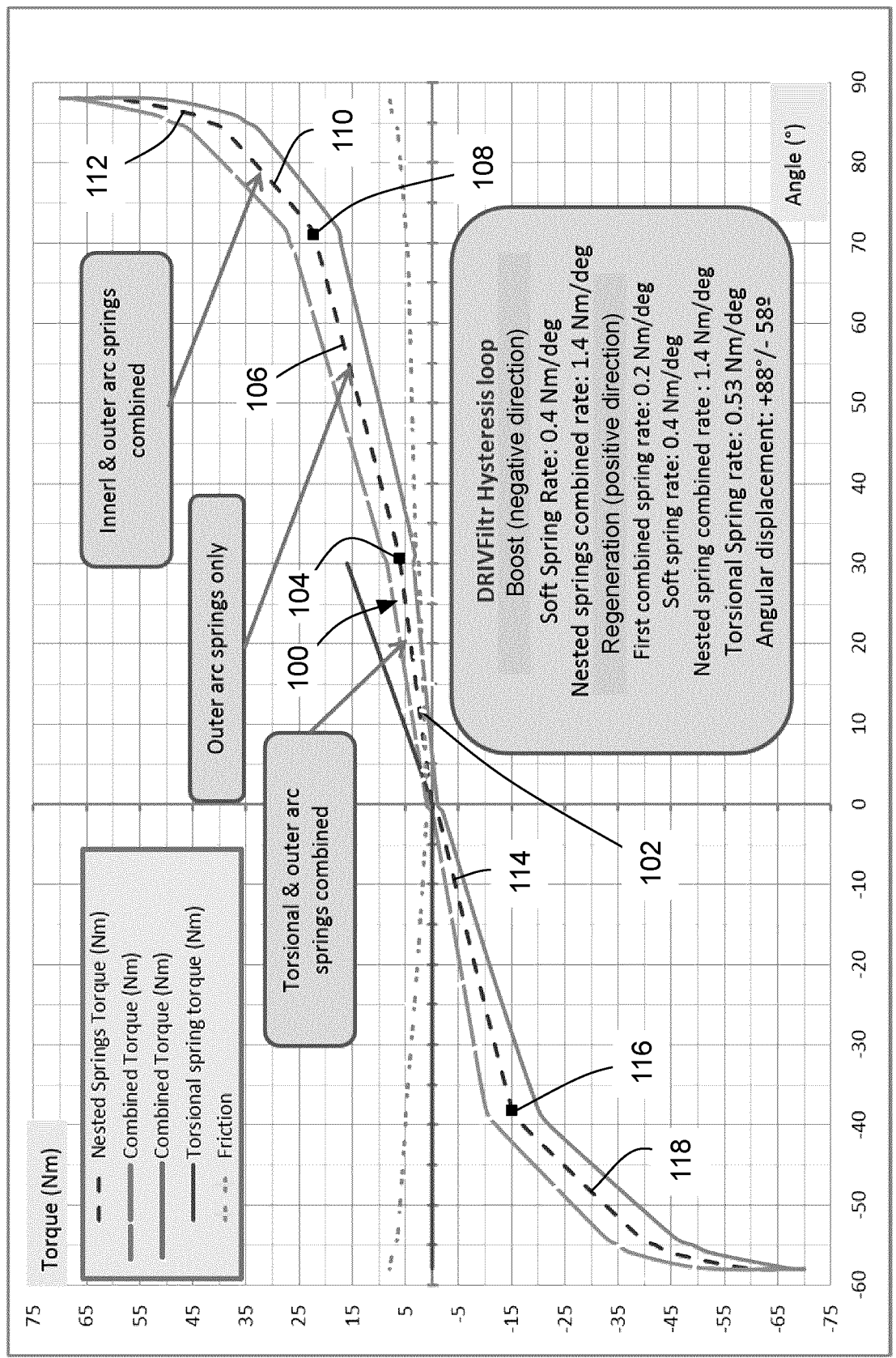
FIG. 6 is a graph illustrating a torque/displacement relationship for the isolator shown in FIG. 1.

The combination of the first and second isolation spring arrangements 16 and 18 result in a torque/displacement relationship as shown on the right hand side of FIG. 6 (i.e. the region of the graph between 0 and 90 degrees of relative displacement) during torque transfer from the pulley 14 to the shaft adapter 12. In FIG. 6, when the pulley 14 moves relative to the shaft adapter 12 in a first rotational direction (clockwise in the views shown in FIGS. 5a and 5b as represented by arrow D1), the angular movement is positive, and is indicative of the engine 51 driving the belt and thereby driving the MGU shaft through the isolator 10. Thus, this portion of FIG. 6 relates to what may be referred to as 'Regen mode', which is the mode in which the engine 51 is being used to recharge the vehicle's battery (not shown). The opposite mode, (i.e. when the MGU 53 is used to drive the belt 14) may be referred to as 'Boost mode'. Boost mode is discussed further below.

In relation to Regen mode, as can be seen by the dark, dashed line 100, over a first angular range of relative movement (shown at 102) between the pulley 14 and the shaft adapter 12, the first and second isolation spring arrangements 16 and 18 provide a first overall spring rate for the isolator 10. This first overall spring rate is the result of the torsion spring 30 and the first arcuate helical compression springs 42 operating in series. As a result, the first spring rate is relatively low. The torsion spring 30 may have a spring rate of about 0.53 Nm/degree of angular displacement. Nm/degree of angular displacement may, for convenience, simply be referred to as Nm/deg. The first helical compression springs 42 may together have an effective spring rate of about 0.4 Nm/deg. The overall first spring rate may be, therefore, about 0.2 Nm/deg.

At a first selected angular displacement, shown at 104, the torsion spring 30 locks up against the torque limiter sleeve 28, thereby effectively locking the shaft adapter 12 and the intermediate member 20 together. As a result, for a second angular range of relative movement (shown at 106) between the pulley 14 and the shaft adapter 12, the first and second isolation spring arrangements 16 and 18 provide a second overall spring rate for the isolator 10, which is higher than the first overall spring rate. This is because, over the second angular range of relative movement 106, only the first helical compression springs 42 are contributing to the overall spring rate; the torsion spring 30 is locked up, and angular displacement is not sufficient yet for the second helical compression springs 44 to be compressed. In the example shown, over the second angular range of relative movement 106, the overall spring rate may be about 0.4 Nm/deg.

At a second selected angular displacement 108, the second helical compression springs 44 begin to be compressed between the drive surfaces 60 and 64 on the pulley 14 and the intermediate member 20. As a result, over a third angular range of relative movement between the pulley 14 and the shaft adapter 12, shown at 110, the first and second helical compression springs operate in parallel to provide a third overall spring rate for the isolator 10 that is higher than the second overall spring rate. In the example shown, over the second angular range of relative movement 106, the overall spring rate may be about 1.4 Nm/deg. Once one or both of the helical compression springs 42 or 44 begins to lock up (i.e. begins to reach a maximum state of compression), the overall spring rate for the isolator may increase to be effectively infinite as no further compliance will be present in the isolator 10. This is shown in region 112 of the graph in FIG. 5. Thus, as can be seen, the isolator 10 has three regions of relative angular displacement between the pulley 14 and the shaft adapter 12, in which the overall spring rate is finite and wherein the overall spring rate increases from one region to the next.

Optionally, the shaft adapter 12 and the intermediate member 20 are provided with spring bypass surfaces, shown in FIGS. 2 at 72 and 74 respectively, which are engageable with one another when a selected amount of movement of the shaft adapter 12 takes place relative to the pulley 14 in the first rotational direction D1. This occurs when the engine 51 and the endless drive arrangement are being operated in the aforementioned Boost mode, whereby the MGU 53 drives the shaft adapter 12, which in turn, drives the remainder of the isolator 10, which drives the belt 52. This may be for the purposes of providing additional power to the engine 51 for driving the vehicle, or may be for other purposes such as starting the engine 51 via the belt 52 (BAS), or driving accessories via the belt when the engine 51 is shut down temporarily (i.e. Idle-Stop Accessory Function (ISAF)).

When the shaft adapter 12 is being driven by the MGU 53, the shaft adapter drive surface 38 pulls away from the second spring end 34, and/or the first spring end 32 is dragged frictionally by the shaft adapter 12 and pulls away from the first intermediate member spring drive surface 40. In both cases, no significant torque is transferred from the shaft adapter 12 to the intermediate member 20 through the torsion spring 30. At the selected amount of relative movement the first spring bypass surface 72 engages the second spring bypass surface 74 and the shaft adapter 12 then drives the intermediate member 20 directly, essentially bypassing the torsion spring 30. The intermediate member 20 in turn transmits torque via engagement of the third intermediate member drive surfaces 64 and the second ends 48 of the springs 42. In turn, the first ends 46 of the first helical compression springs 42 transmits torque into the second pulley drive surfaces 62, thereby driving the pulley 14, which in turn drives the belt 52. The torque transfer from the shaft adapter to the pulley 14 is shown at T2 in FIG. 5b. As can be seen, torque is transferred from the shaft adapter 12 into the intermediate member 20, in turn into the second isolation spring arrangement 18, and in turn into the pulley 14. Thus, the torsion spring 30 is not significantly involved in the torque transfer in Boost mode.

The left side of FIG. 6 shows the torque transfer that takes place during Boost mode. As can be seen, there are only two different overall spring rates that apply during Boost mode, because the torsion spring 30 is bypassed. Accordingly, over a first range of movement 114 of the shaft adapter 12 in the first rotational direction D1 relative to the pulley 14, the first and second isolation spring arrangements 16 and 18 provide a fourth overall spring rate for the isolator 10. In this range of angular movement, the first helical compression springs 42 are the only springs being used to transmit torque, and so the fourth spring rate may be the same as the second spring rate described above. At a selected point shown at 116, the shaft adapter 12 moves sufficiently relative to the pulley 14 that the second helical compression springs begin to be compressed. Over a second range of movement 118 of the shaft adapter 12 in the first rotational direction relative to the pulley 14 the first and second isolation spring arrangements 16 and 18 provide a finite fifth overall spring rate for the isolator 10 that is higher than the fourth overall spring rate. In the second range of movement 118 of the shaft adapter 12, both the first and second helical compression springs 42 and 44 are compressed and operate in parallel. Accordingly, the fifth overall spring rate may be the same as the third overall spring rate described above. Beyond the second range of movement 118, the overall spring rate may increase to infinity in similar manner to the spring rate shown in region 112 of the graph in FIG. 6.

Figure 3:
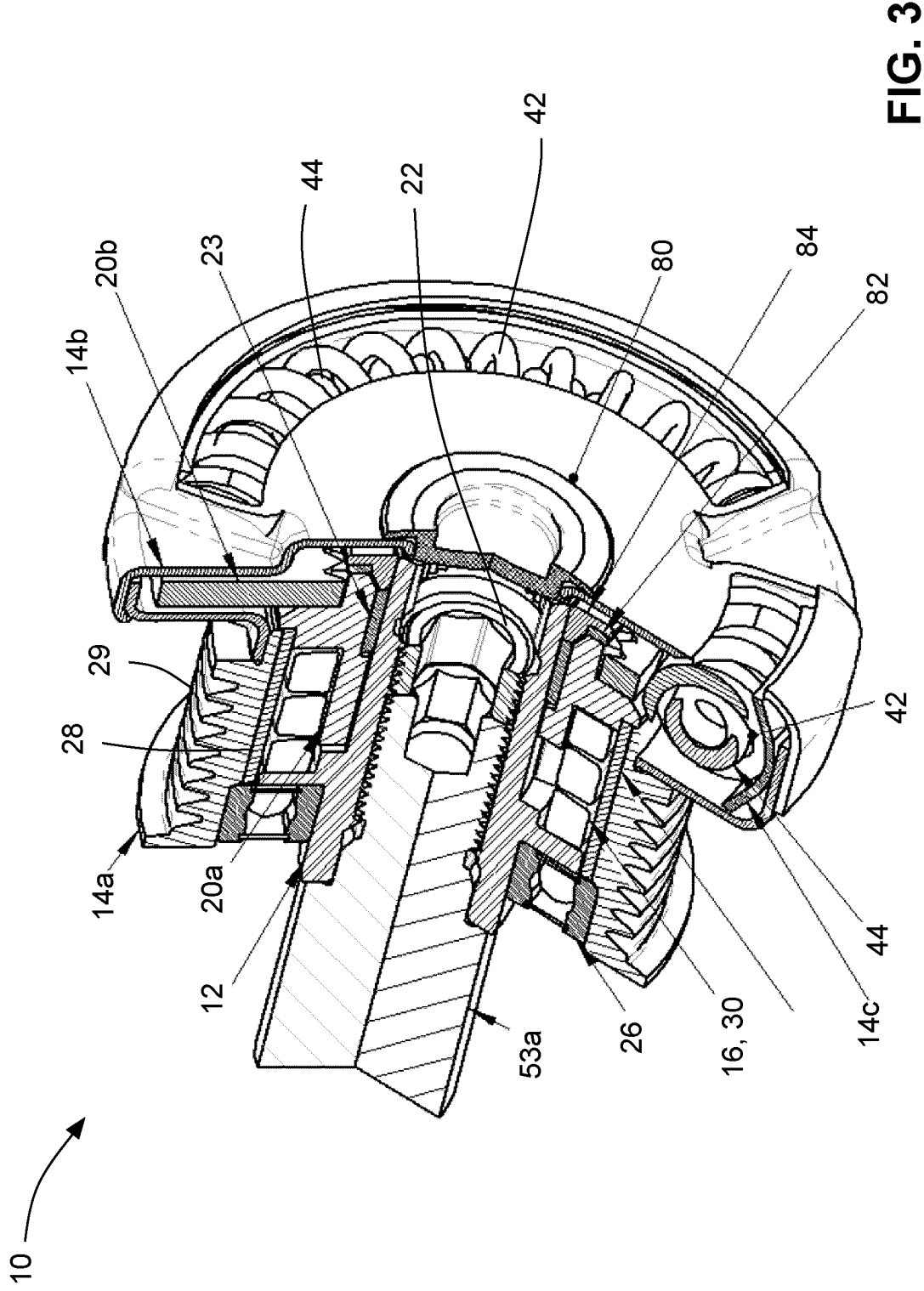
FIG. 3 is a perspective cutaway view of the isolator shown in FIG. 1.
Figure 4:
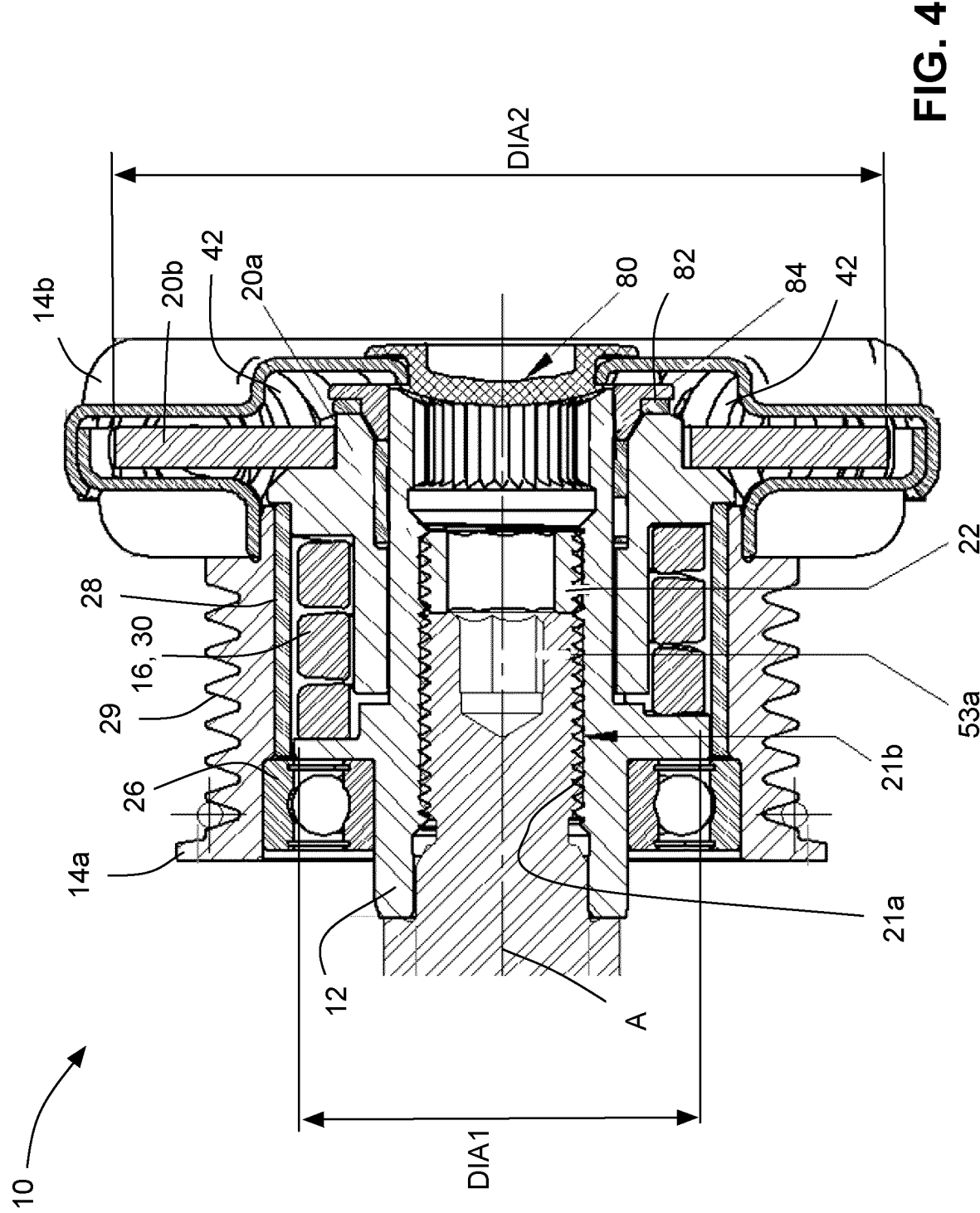
FIG. 4 is a sectional side view of the isolator shown in FIG. 1.

As can be seen in FIGS. 3 and 4 in particular, the helical compression springs 42 and 44 are arcuate about the isolator axis A and have an outer diameter shown at DIA2 that is larger than an outer diameter (shown at DIA1) of the first torsion spring 30. The helical compression springs 42 and 44 are also axially spaced from the belt engagement surface 29, so that there is freedom to provide them with as large a diameter as is desired. This permits them to have both a spring rate that is as desired and a range of angular travel as desired before there is no further room for them to compress. In some embodiments, as shown in FIG. 4, the helical compression springs 42 (and optionally 44) extend radially beyond the endless drive member engagement surface 29. By providing the second isolation spring arrangement 18 in series with the torsion spring, an isolator 10 is provided that is both compact dimensionally at the belt engagement surface 29 and that has a relatively large amount of angular travel and a relatively low initial spring rate, which increases gradually as angular movement increases. By including the torsion spring 30 when driving the pulley 14 by the belt, and bypassing the torsion spring 30 when driving the shaft adapter 12 by the MGU 53, the initial spring rate in Regen mode can be kept low so as to reduce the amount of vibration that is transferred into the MGU 53 from the engine 51, but can progressively increase over a large range of movement so as to ensure that the isolator 10 does not lock up under the expected range of operating conditions, while at the same time, the spring rate in Boost mode can be initially higher than in the initial range of movement in Regen mode. Accordingly, many advantages are achieved by the presently described construction over isolators of the prior art.

In the embodiment shown, the effective spring rate for the first helical compression springs 42 is different than that of the torsion spring 30 and the effective spring rate for the second helical compression springs 44 is different than that of both the first helical compression springs 42 and the torsion spring 30, although some of the springs 30, 42 and 44 may have the same spring rate as one another while still being usable to change the overall spring rate by being combined in series or in parallel with the other springs 30, 42 or 44.

With reference to FIG. 2, the isolator 10 may further include additional components including: a plug 80 that blocks a fastener access aperture in the isolator 10 to prevent contaminants from migrating into the aperture, a thrust washer 82 and a press-fit bushing 84 that mounts to the shaft adapter 12 to retain other isolator components in place on the shaft adapter 12.

Isolator with First Torsion Spring in Series with a Second Torsion Spring

Figure 7:
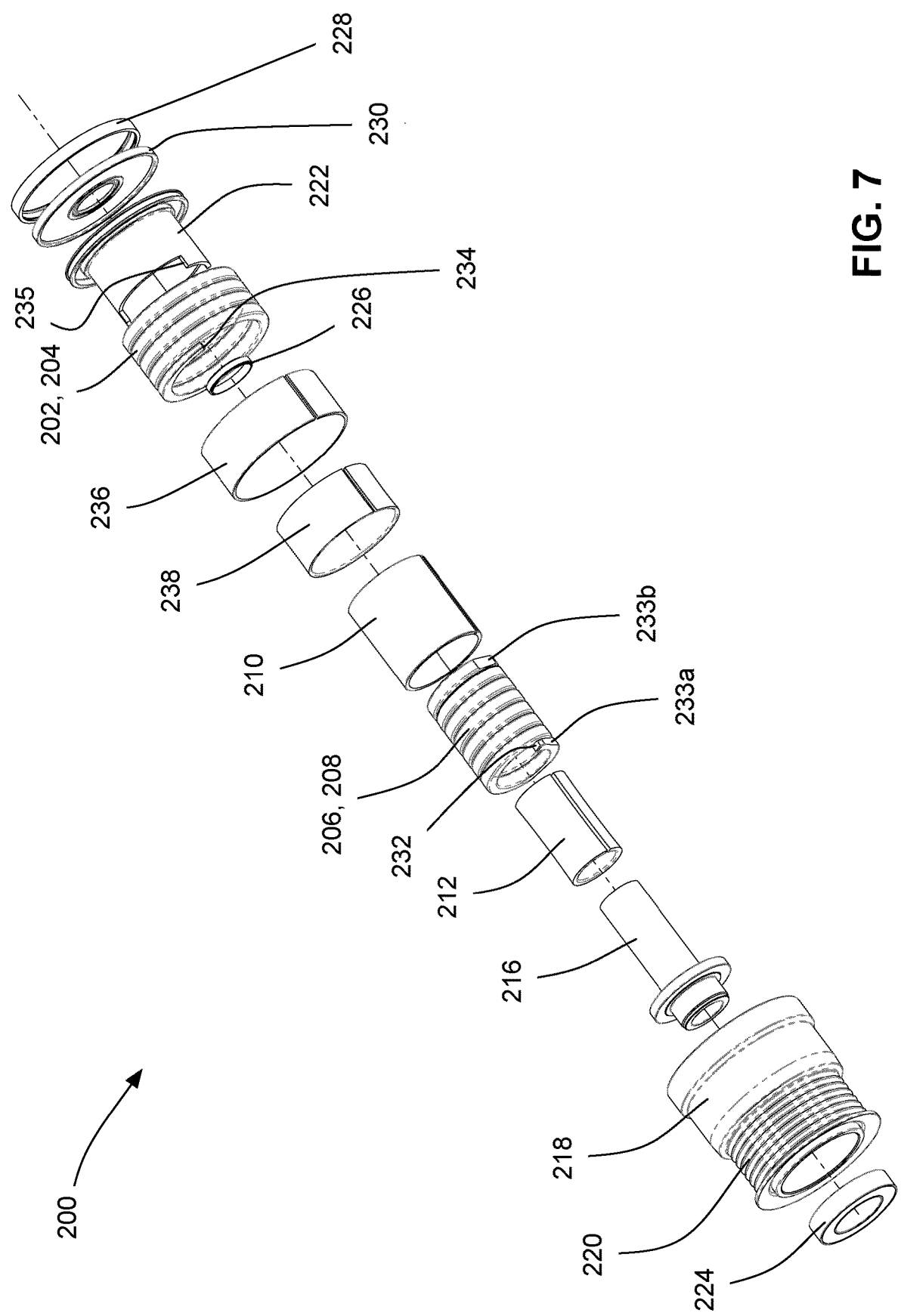
FIG. 7 is an exploded perspective view of an isolator according to an alternative embodiment of the disclosure.
Figure 8:
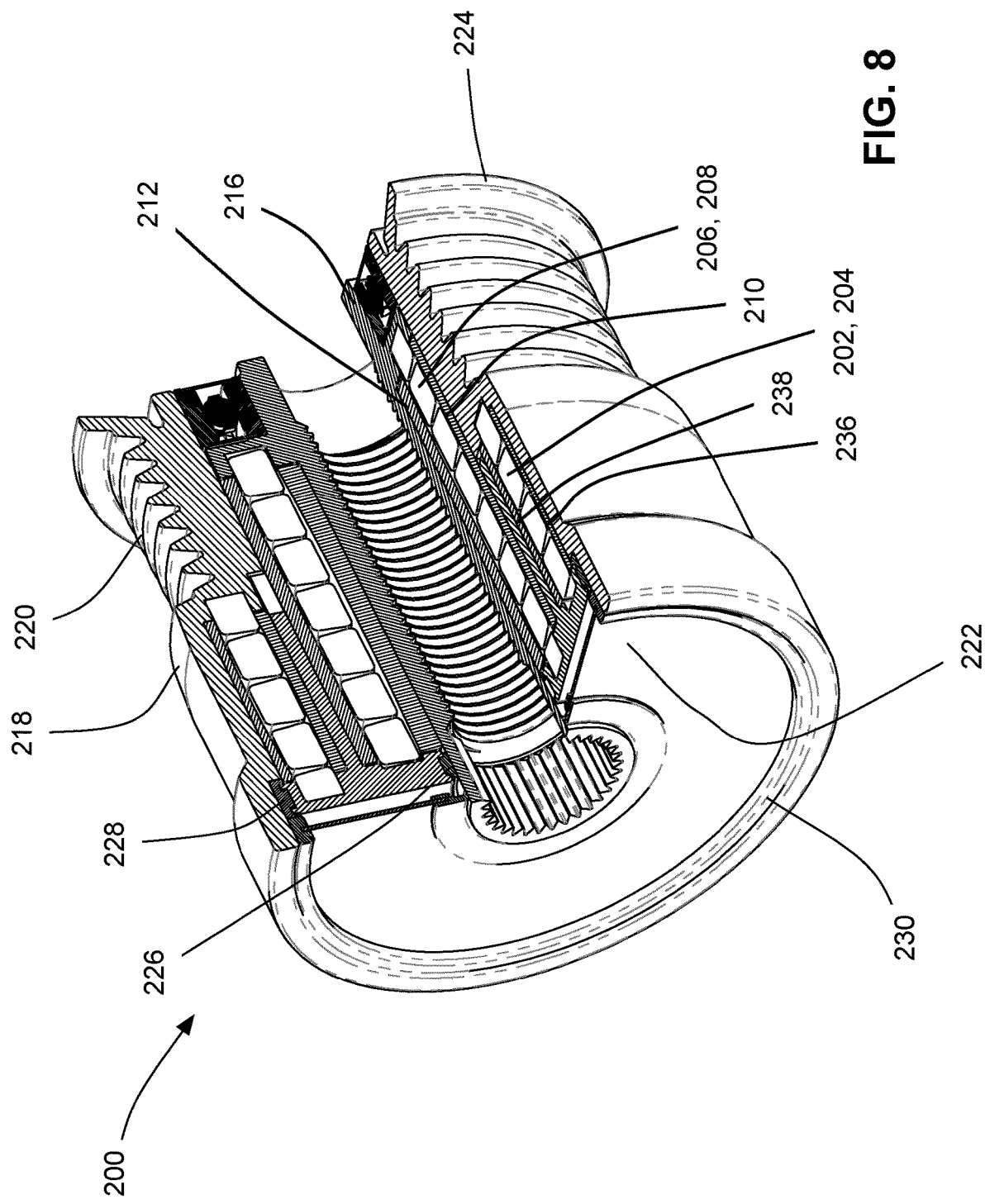
FIG. 8 is a perspective cutaway view of the isolator shown in FIG. 7.

Reference is made to FIG. 7, which shows an isolator 200 that is similar to the isolator 10 but which has a second isolation spring arrangement 202 that includes a helical torsion spring 204 instead of including one or more helical compression springs. Other aspects of the isolator 200 may be similar to those of the isolator 10. For example, the isolator 200 has a first isolation spring arrangement 206 that may include a torsion spring 208 that is similar to the torsion spring 30. The first torsion spring 208 may be surrounded by a first outer torque limiter sleeve 210 that is positioned to prevent radial expansion of the torsion spring 208. A first inner torque limiter sleeve 212 may also be provided to support the radially inner surface (shown at 214 in FIG. 9) of the torsion spring 208.

The isolator 200 further includes a shaft adapter 216 that is similar to the shaft adapter 12, a rotary drive member 218 (e.g. a pulley) that is similar to the rotary drive member 14, and which has an endless drive member engagement surface 220 thereon for engagement with the endless drive member 52 (FIG. 1). The isolator 200 further includes an intermediate member 222. A pulley bearing 224 rotatably supports the pulley 218 on the shaft adapter 216. An intermediate member bushing 226 rotatably supports the intermediate member 222 on the shaft adapter 216. A pulley bushing 228 rotatably supports a second point on the pulley 218 that is axially spaced from the pulley bearing 224. A seal member 230 is also provided to inhibit migration of contaminants in the isolator 200.

The first torsion spring 208 may be similar to the first torsion spring 30 and has a first helical end (not shown but which is similar to the first helical end 32 (FIG. 2)) that engages a first intermediate member drive surface (not shown but which is similar to the first helical end 40 (FIG. 2)), and has a second helical end shown at 232 that engages a shaft adapter drive surface (not shown) that is similar to the shaft adapter drive surface 38 (FIG. 2).

It will be noted, however, that the first and last coils of the first torsion spring 208 may include locking features 233a and 233b (in this instance, flat surfaces that engage mating flat surfaces on the shaft adapter 216 and the intermediate member 222 respectively. As a result, the torsion spring 208 is capable of transmitting torque both when the pulley 218 is driving the shaft adapter 216 and when the shaft adapter 216 is driving the pulley 218. By contrast, the second torsion spring 204 lacks such locking features and so when the pulley 218 is driving the shaft adapter 216, torque transfer takes place through the second torsion spring 204, but when the shaft adapter 216 is driving the pulley 218, the drive surfaces pull away from the helical ends of the second torsion spring 204, and instead bypass surfaces engage one another so as to directly drive the pulley 218 from the intermediate member 222, thereby bypassing the second torsion spring 204.

The second torsion spring 204 may be similar to the first torsion spring 208 and may thus have a first helical end (not shown) that is engaged with a second intermediate member drive surface (not shown) and a second helical end 234 that is engaged with a pulley drive surface (not shown) on the pulley.

The second torsion spring 204 may be surrounded by a second outer torque limiter sleeve 236 that is positioned to prevent radial expansion of the torsion spring 204. A second inner torque limiter sleeve 238 may also be provided to support the radially inner surface (shown at 240 in FIG. 9) of the torsion spring 204.

Figure 10A:
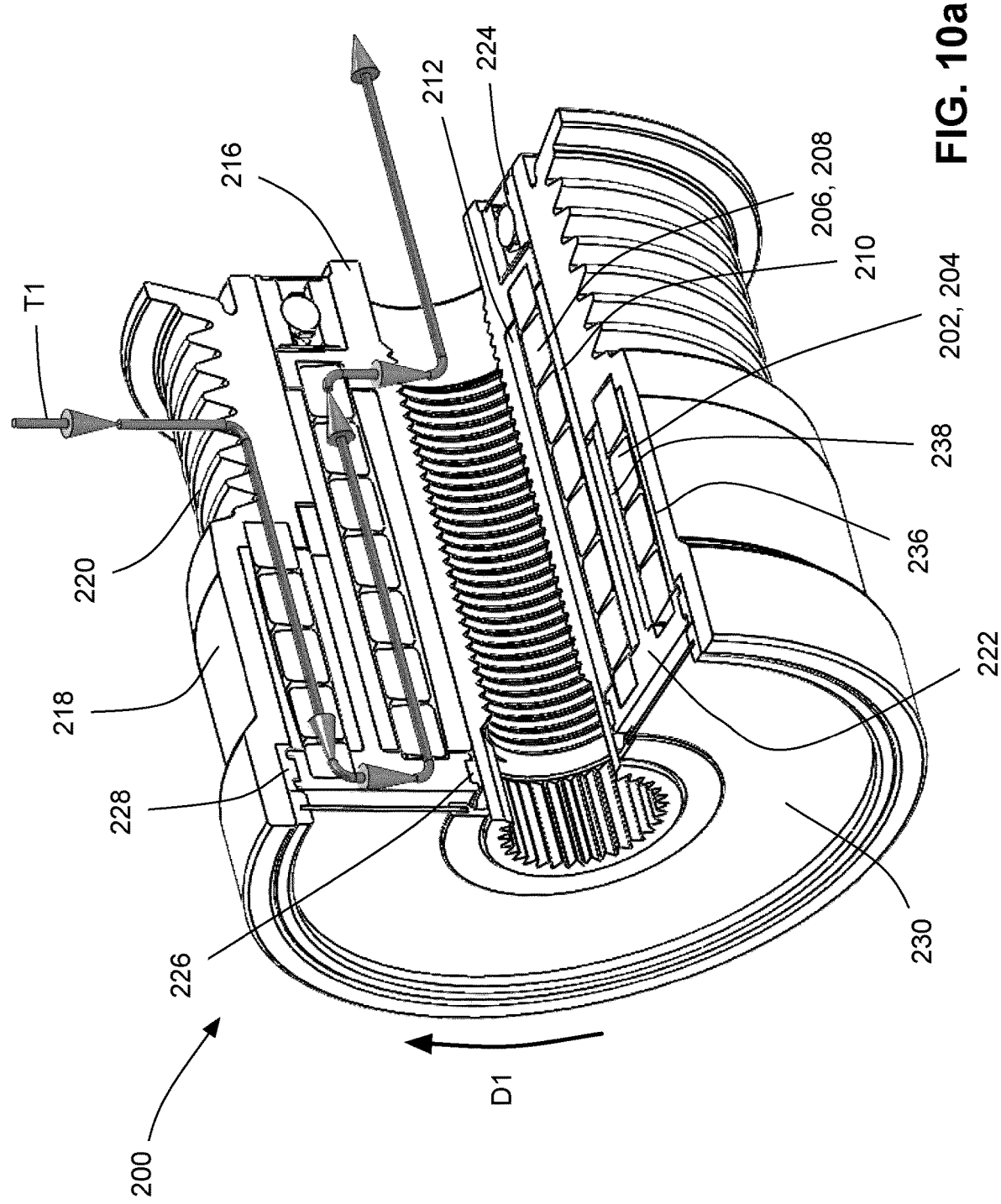
FIGS. 10a and 10b are perspective cutaway views of the isolator shown in FIG. 7 illustrating torque paths through the isolator.

The torque path through the isolator 200 from the pulley 218 to the shaft adapter 216 is shown in FIG. 10a. As can be seen, torque is transferred from the pulley 218 to the second end 234 of the second torsion spring 204, through the second torsion spring 204, in turn from the first end of the second torsion spring 204 to the intermediate member 222, from the intermediate member 222 into the first torsion spring 208, through the first torsion spring 208 and from the first torsion spring 208 into the shaft adapter 216.

Figure 10B:
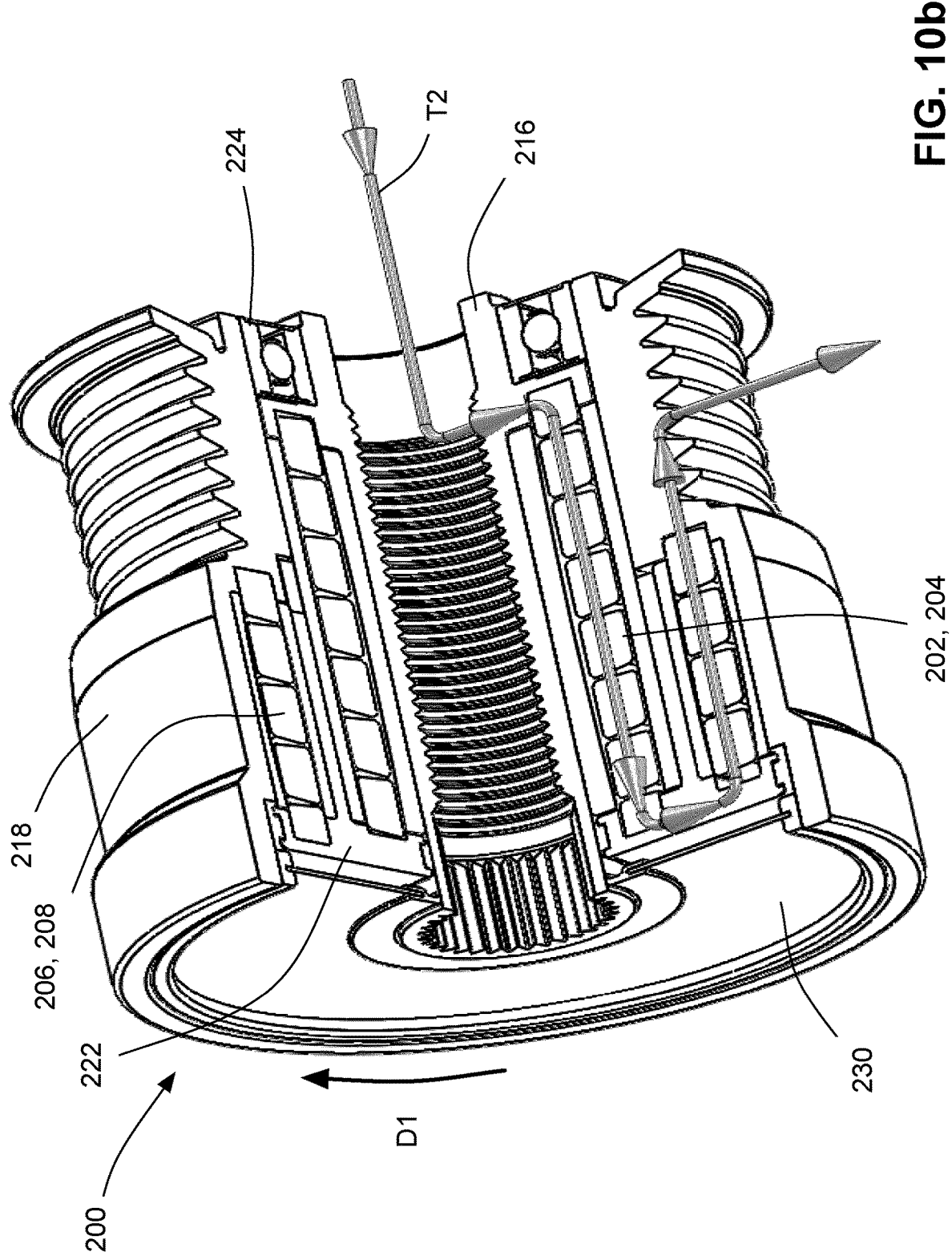

The torque path through the isolator 200 from the shaft adapter 216 to the pulley 218 is shown in FIG. 10b. As can be seen, torque is transferred from the shaft adapter 216 to the end 232 of the first torsion spring 208, through the first torsion spring 208, in turn from the other end of the second torsion spring 204 to the intermediate member 222, from the intermediate member 222 into the second torsion spring 204, through the second torsion spring 204 and from the second torsion spring 204 into the pulley 218. A bypass surface is shown at 235 in FIG. 7 on the intermediate member 222. This surface 235 engages an internal surface (not shown) in the pulley 218 to bypass the second torsion spring 204 in similar manner to the bypass surfaces.

Figure 11:
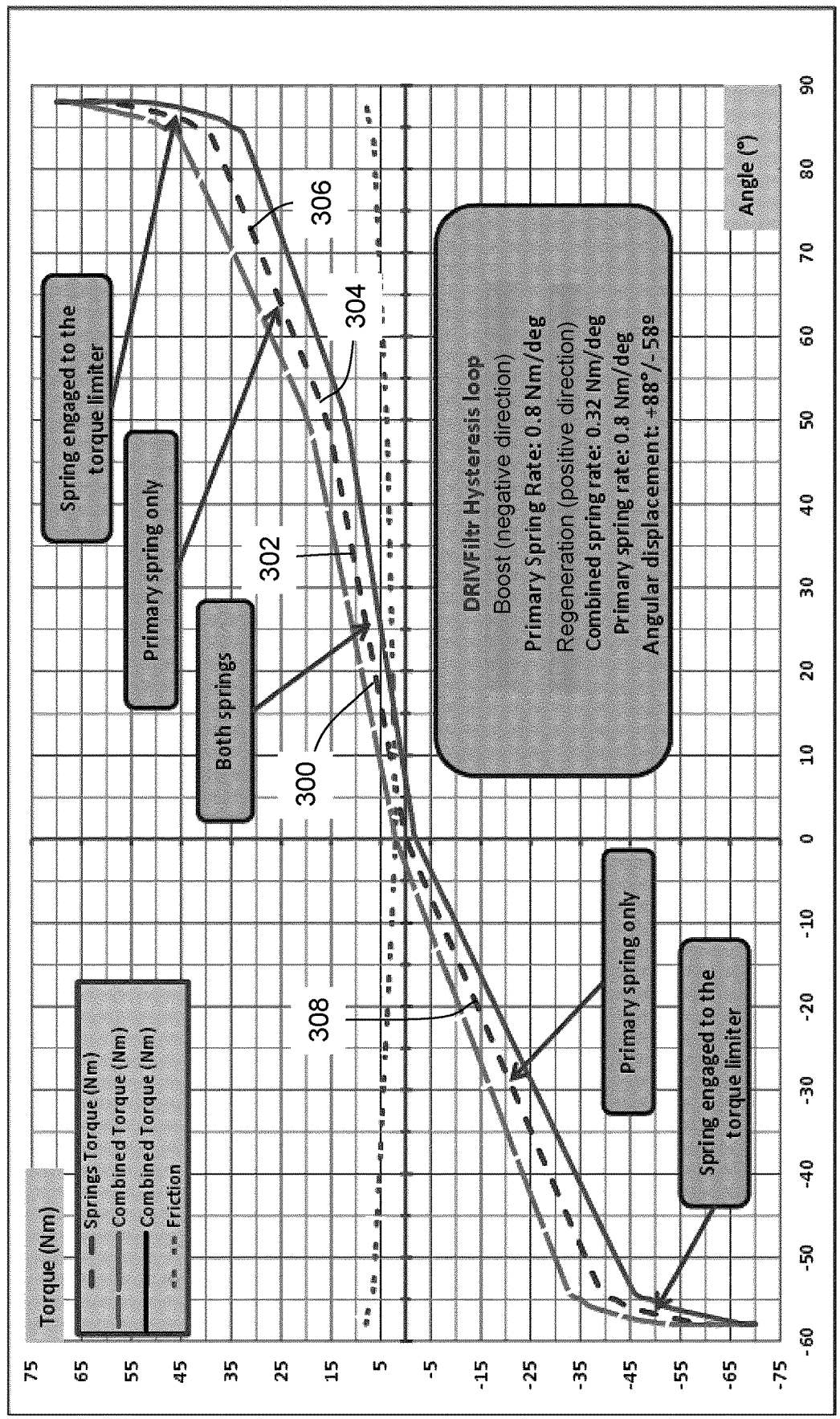
FIG. 11 is a graph illustrating the torque/displacement relationship for the isolator shown in FIG. 1.

The graph in FIG. 11 illustrates the torque/displacement relationship for the isolator 200. The curve 300 shows the torque/displacement curve. The combination of the first and second isolation spring arrangements 202 and 206 result in a torque/displacement relationship as shown on the right hand side of FIG. 11 (i.e. the region of the graph between 0 and 90 degrees of relative displacement) during torque transfer from the pulley 218 to the shaft adapter 216. When the pulley 218 moves relative to the shaft adapter 216 in a first rotational direction (clockwise in the views shown in FIGS. 10a and 10b as represented by arrow D1), the angular movement is positive, and is indicative of the engine 51 driving the belt 52 and thereby driving the MGU shaft 53a through the isolator 10 (i.e. Regen mode).

As can be seen, over a first range of relative movement 302 between the pulley 218 and the shaft adapter 216 the first and second torsion springs 208 and 204 provide a first overall spring rate for the isolator. At a first selected relative angular position shown at 304, the second torsion spring 204 locks up against its outer torque limiter sleeve 236, thereby providing a direct driving relationship between the pulley 218 and the intermediate member 222. Then, over a second range of relative angular movement 306 of the pulley 218 relative to the shaft adapter 216, only the first torsion spring flexes and so a second overall spring rate for the isolator 200 is thereby provided, which is higher than the first overall spring rate.

The left side of FIG. 6 shows the torque transfer that takes place during Boost mode (represented by the part of the curve shown at 308). As can be seen, there is only one overall spring rate that applies during Boost mode, because the torsion spring 204 is bypassed. This spring rate may be the same as the spring rate in the region 306 for the curve 300.

It will be noted that in some embodiments, the second torsion spring 204 has an outer diameter (DIA2) that is larger than an outer diameter (DIA1) of the first torsion spring.

Figure 9:
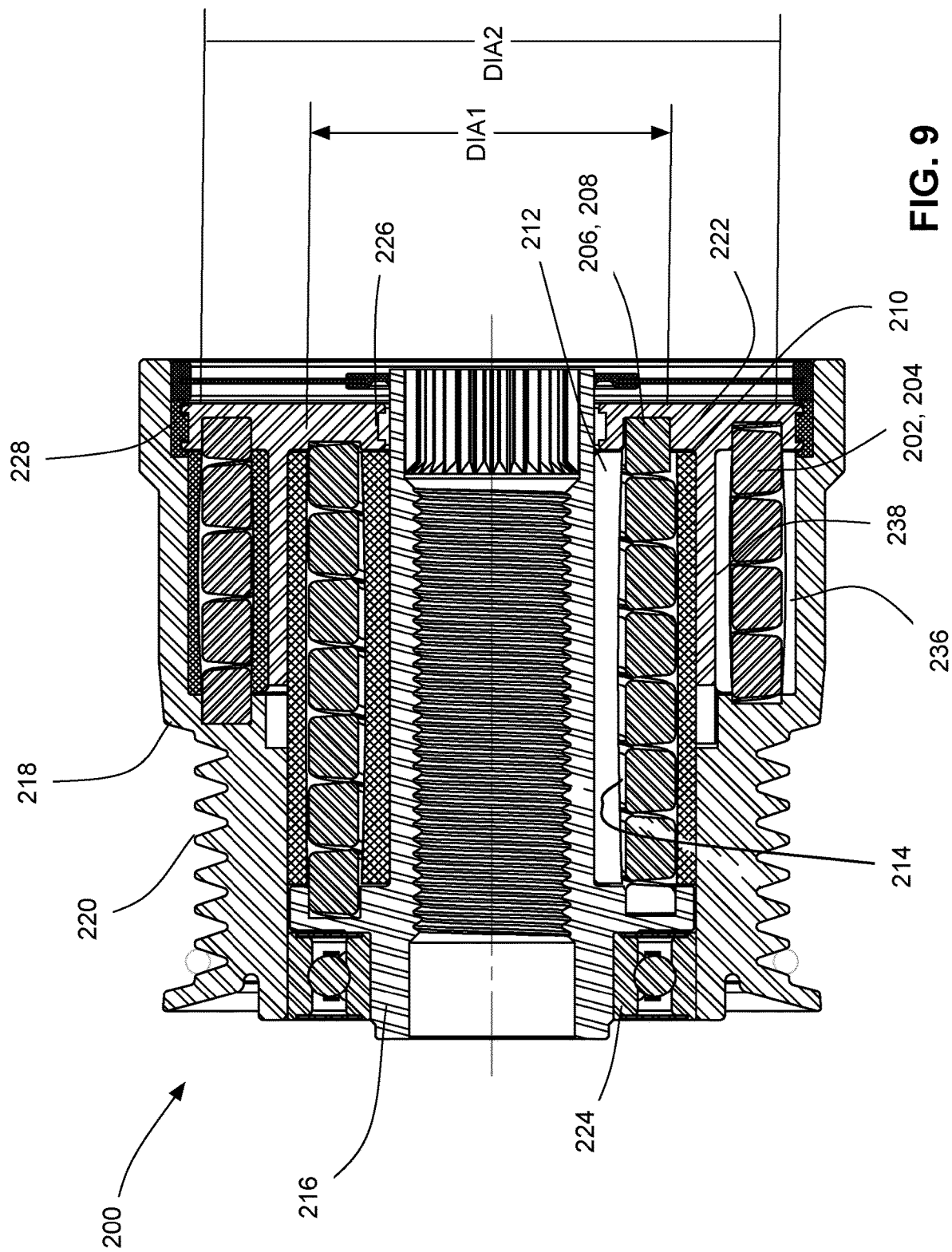
FIG. 9 is a sectional side view of the isolator shown in FIG. 7.

In some embodiments, such as the one shown in FIG. 9, the second torsion spring 208 radially surrounds at least a portion of the first torsion spring 208.

In some embodiments, the second torsion spring 204 is axially spaced from the endless drive member engagement surface 220.

In some embodiments, the first torsion spring 208 has a first spring rate and the second torsion spring 204 has a second spring rate that is different than the first spring rate.

In some embodiment, the intermediate member 222 and one of the shaft adapter 216 or the pulley 218 each have a spring bypass surface, wherein the spring bypass surfaces are positioned to engage one another to provide a solid drive connection between the intermediate member 222 and said one of the shaft adapter 216 or the pulley 218 during relative rotation during torque transfer from the shaft adapter to the pulley thereby bypassing the one of the isolation spring arrangements.

While it has been described that the Boost mode has fewer spring rates that apply to it, relative to the Regen mode, in an alternative embodiment the arrangements of the torsion springs (i.e. the handedness of the torsion springs) may be reversed and the drive surfaces repositioned as necessary so that the Boost mode has additional overall spring rates relative to the Regen mode which has fewer due to bypassing of a torsion spring spring. Thus the right sides of the curves 100 and 300 would represent the boost mode and the left sides would represent the Regen mode.

While the above description constitutes a plurality of embodiments of the present invention, it will be appreciated that the present invention is susceptible to further modification and change without departing from the fair meaning of the accompanying claims.

The invention claimed is:

1. An isolator for isolating a device driven by an engine via an endless drive member, comprising:
   a shaft adapter that is connectable with a shaft of the device, the shaft adapter defining an isolator axis;
   a rotary drive member that is engageable with the endless drive member;
   a first isolation spring that is positioned to transfer torque between the shaft adapter and an intermediate drive member; and
   a second isolation spring arrangement that is positioned to transfer torque between the intermediate member and the rotary drive member,
   wherein the intermediate member and the shaft adapter each have a spring bypass surface, wherein the spring bypass surfaces are positioned to engage one another to provide a solid drive connection between the intermediate member and the shaft adapter during relative rotation during torque transfer from the shaft adapter to the intermediate member thereby bypassing the first isolation spring arrangement, such that, torque transfer from the rotary drive member to the shaft adapter is carried out through the first isolation spring arrangement, and torque transfer from the shaft adapter to the rotary drive member is carried out through the second isolation spring arrangement and the solid drive connection.

2. An isolator as claimed in claim 1, wherein the first and second spring arrangements are positioned such that torque transfer from the rotary drive member to the shaft adapter is transmitted through the first and second isolation spring arrangements.

3. An isolator as claimed in claim 1, wherein the first isolation spring arrangement includes a torsion spring.

4. An isolator as claimed in claim 1, wherein the second isolation spring arrangement includes a second torsion spring having an outer diameter that is larger than an outer diameter of the first torsion spring.

5. An isolator as claimed in claim 4, wherein the second torsion spring radially surrounds at least a portion of the first torsion spring.

6. An isolator as claimed in claim 4, wherein the rotary drive member has an endless drive member engagement surface and wherein the second torsion spring is axially spaced from the endless drive member engagement surface.

7. An isolator as claimed in claim 4, wherein the first torsion spring has a first spring rate and the second torsion spring has a second spring rate that is different than the first spring rate.

8. An isolator as claimed in claim 1, wherein the first and second spring arrangements are positioned such that torque transfer from the rotary drive member to the shaft adapter is transmitted through the first and second isolation spring arrangements.

9. An isolator as claimed in claim 1, wherein the second isolation spring arrangement includes at least one helical compression spring.

10. An isolator as claimed in claim 9, wherein the at least one helical compression spring is arcuate about the isolator axis and has an outer diameter that is larger than an outer diameter of the first torsion spring.

11. An isolator as claimed in claim 9, wherein the rotary drive member has an endless drive member engagement surface, and wherein the at least one helical compression spring is arcuate about the isolator axis and extends radially beyond the endless drive member engagement surface.

12. An isolator as claimed in claim 9, wherein the at least one helical compression spring includes two first helical compression springs.

13. An isolator as claimed in claim 12, wherein the at least one helical compression spring further includes two second helical compression springs nested within the two first helical compression springs.

14. An isolator as claimed in claim 12, wherein the two second helical compression springs are shorter than the two first helical compression springs.

15. An isolator as claimed in claim 14, wherein the two first helical compression springs together have a first helical compression spring rate and wherein the two second helical compression springs together have a second helical compression spring rate that is different than the first helical compression spring rate.

16. An isolator for isolating a device driven by an engine via an endless drive member, comprising:
a shaft adapter that is connectable with a shaft of the device, the shaft adapter defining an isolator axis;
a rotary drive member that is engageable with the endless drive member;
a first isolation spring that is positioned to transfer torque between the shaft adapter and an intermediate drive member; and
a second isolation spring arrangement that is positioned to transfer torque between the intermediate member and the rotary drive member,
wherein over a first range of relative angular movement between the rotary drive member and the shaft adapter the first and second isolation spring arrangements provide a first finite overall spring rate for the isolator, over a second range of relative angular movement between the rotary drive member and the shaft adapter the first and second isolation spring arrangements provide a second finite overall spring rate for the isolator that is higher than the first overall spring rate, and wherein over a third range of relative angular movement between the rotary drive member and the shaft adapter the first and second isolation spring arrangements provide a third finite overall spring rate for the isolator that is higher than the second overall spring rate.

17. An isolator as claimed in claim 16, wherein the first, second and third ranges of relative angular movement between the rotary drive member and the shaft adapter are made up respectively of first, second and third ranges of movement of the rotary drive member in a first rotational direction relative to the shaft adapter.

18. An isolator as claimed in claim 17, wherein over a first range of movement of the shaft adapter in the first rotational direction relative to the rotary drive member the first and second isolation spring arrangements provide a fourth overall spring rate for the isolator, and wherein over a second range of movement of the shaft adapter in the first rotational direction relative to the rotary drive member the first and second isolation spring arrangements provide a finite fifth overall spring rate for the isolator that is higher than the fourth overall spring rate.

* * * * *